2,888,424

CURABLE POLYETHYLENE COMPOSITION COMPRISING A PEROXIDE CONTAINING TERTIARY CARBON ATOMS, AND A FILLER, AND PROCESS OF CURING SAME

Frank M. Precopio and Alfred R. Gilbert, Schenectady, N.Y., assignors to General Electric Company, a corporation of New York No Drawing. Application May 18, 1955
Serial No. 509,387

16 Claims. (Cl. 260—41)

This invention relates to compositions comprising a tertiary peroxide, a filler, and a member of the group consisting of polyethylene and blends of polyethylene with other polymers (hereafter called polyethylene blends); and the cured products thereof. More particularly, this invention relates to compositions comprising a member of the group consisting of polyethylene and polyethylene blends, di-α-cumyl peroxide (also referred to as DCP) and fillers selected from the group consisting of silica, carbon black, alumina and calcium silicate; and the cured products thereof.

In the gamut of polymeric materials which have evolved in recent years, polyethylene has proved to be one of the most popular. It has found wide usage as a insulating material, as a container material, as a conduit material, etc. Fabrication, molding, extrusion and calendering of polyethylene are readily accomplished by standard methods, thus facilitating its use for many purposes. Despite all this, however, the applications of polyethylene are greatly limited by its lack of form stability, that is, the ability to retain a particular shape at elevated temperatures, and by its poor high temperature properties, such as poor high temperature tensile strength, tear strength, cut-through strength, etc.

The incorporation of fillers in polyethylene has been described by Bostwick et al. in "Industrial and Engineering Chemistry" 42, pages 848–849 (1950), where, for example, such fillers as silica, carbon black, clay, calcium carbonate, magnesium carbonate, etc., have been used as fillers. In that publication, it has been shown that the incorporation of fillers in polyethylene markedly increased the stiffness or rigidity of polyethylene. Therefore, it was concluded by the authors that fillers reduced the tensile strength, tear strength, and ultimate elongation of polyethylene, and that decreased elongation and decreased tear strength combined to make filled polyethylene less resistant to cracking or breaking when bent sharply, as compared to the unfilled resin.

U.S. Patent 2,628,214, Pinkney et al., and British Patents 619,905 and 659,958 relate to peroxide-cured polyethylene wherein a general application of fillers to peroxide-cured polyethylene compositions is recited. Specifically, in U.S. Patent 2,628,214 and British Patent 619,905, there is disclosed the use of calcium carbonate, iron oxide or crown clay in an ethylene-vinyl acetate copolymer wherein benzoyl peroxide is used as the curing agent.

We have now discovered that tertiary peroxide-cured and most particularly di-α-cumyl peroxide-cured polyethylene containing a filler selected from the group consisting of silica, carbon blacks, alumina, and calcium silicate (hereafter collectively called preferred fillers) possesses markedly improved properties such as increased tensile strength and percent elongation, particularly at high temperatures, as compared to tertiary peroxide-cured and di-α-cumyl peroxide-cured polyethylene containing other fillers or filled polyethylene cured with other peroxides.

In general, the invention is carried out by intimately mixing a preferred filler, polyethylene and a tertiary peroxide and subsequently curing this admixture-composition. The admixture of filler, polyethylene, and peroxide is effected by any convenient method, for example, the filler-polyethylene-peroxide composition can be mixed directly on a 2-roll rubber mill, a Banbury mixer, etc. Preferably, the polymer is added first, then the filler, and the peroxide last. The mixing of filler, polyethylene and the peroxide may be accomplished over a wide range of temperatures, depending on the particular peroxide employed. Although this admixture can be prepared at room temperature if the polyethylene and filler are sufficiently finely divided, it is generally prepared at elevated temperatures, such as at about 100 to 135° C. With a peroxide having a relatively long half life at a higher temperature, the upper limit of this operation may be extended to a point at which peroxide is not appreciably destroyed. In this manner, a homogeneous mixture of filler, polyethylene and peroxide is obtained.

Thereupon, this mixture can be fabricated, molded, extruded or calendered, etc., by suitable methods. The temperature at which the shaping operation is effected can be varied widely depending on whether it is desired that shaping and curing be accomplished in one operation. If desired, the composition can be cured and shaped by a final heat treatment at about 150° C. or higher but below the decomposition temperature of the polymer. Curing of the filler-polyethylene-peroxide composition can be effected at ordinary pressures or at super-atmospheric pressure, such as from 10 to 1000 pounds per square inch or more in the mold or press. If surface cure alone is desired without affecting the interior, polyethylene-filler compositions containing no peroxide may be extruded into a solution containing the peroxide, and thereupon heat-cured to produce a case hardened polymer. Thin films or filaments extruded and heated in this manner will be sufficiently cured throughout.

The optimum amount of the peroxide to be incorporated into the composition depends upon the time and temperature of the heat treatment, and the degree of cure desired in the polymer. Generally, if the peroxide composition is cured between 150 to 200° C., from 0.1–20% of the tertiary peroxide based on weight of the polymer may be used, but preferably 0.5–10%. However, if polyethylene of greatly reduced thermoplasticity is desired, greater amounts of peroxide may be used.

The polyethylene referred to herein is a polymeric material formed by the polymerization of ethylene. It is described in Patent 2,153,553, Fawcett et al., and in "Modern Plastics Encyclopedia," New York, 1949, pages 268–271. Specific examples of commercially available polyethylene are the polyethylene sold by E. I. du Pont de Nemours & Co., Inc., Wilmington, Delaware, examples of which are "Alathons 1, 3, 10, 12, 14, etc.," those sold by the Bakelite Company, such as "DE–2400, DYNH, etc.," and the Phillips Petroleum Company polymers, such as "Marlex 20, 50, etc." Other polyethylenes of various molecular weights are described by Lawton et al. in "Industrial and Engineering Chemistry" 46, pages 1703–1709 (1954).

The fillers that are useful in this invention are silica, alumina, calcium silicate and carbon black. As a general rule, it is desirable to use those preferred fillers having a surface area of about 1 or more square meters per gram, but preferably more than about 40 square meters per gram.

A class of silicas useful for our invention are those having numerous pores or voids therein. These porous materials having exposed surfaces within the particles so that liquids and gases can penetrate to the surfaces of the pore wall are three-dimensional networks whose surfaces are extended by open pores.

The preparation of high surface area silicas and the chemical changes that occur when silicic acid goes through silica gel or hydrated silica are described in "Natural and Synthetic High Polymers," K. M. Myer, page 85 (1942), and in Hurd, "Chemical Reviews," vol. 22, No. 3, page 403 (1938).

A typical method of preparing precipitated silica comprises precipitating silica by the addition of $H_2SO_4$ to a sodium silicate solution and working the gel relatively free of salts with water. If water is evaporated from the gel in this state, the latter shrinks considerably in volume due to the force exerted on the solid phase of the gel by the surface tension of the liquid as it recedes in the pores of the material. These materials, which are called xerogels, can be used in this invention.

In contrast to xerogels, aerogels are composed of the original solid phase gel in substantially the same condition as while filled with the swelling liquid. Aerogels are conveniently made by raising the gel to the critical temperature of the liquid contained therein while maintaining the pressures on the systems sufficiently high to ensure that the liquid phase will remain liquid until the critical temperature is reached. At this point, the liquid will be converted into the gaseous state without the formation of menisci at the gas liquid interface. The degree of porosity may be controlled to a large degree by controlling the concentration of the silica in the gel as it is precipitated. These aerogels may be used in this condition or they may be ground to a finer state of subdivision.

An example of an aerogel is Santocel-C marketed by Monsanto Chemical Co. which has a specific surface area of about 160 sq. meters per gram.

Silicas prepared by other methods may also be used, for example, by burning various silicon-containing compounds, such as silicate esters (Patent 2,399,687, McNabb) and silicon tetrachloride. An example of a fumed silica that is prepared from burning silicon tetrachloride is "Cab-O-Sil" (also called "Aerosil") having a surface area of about 200 sq. meters per gram is marketed by Godfrey L. Cabot, Inc., Boston, Mass.

In contrast to the above described hydrophilic silicas (i.e. possessing water affinity) are those silicas which have been rendered hydrophobic by chemical treatment, examples of which are the alkyl-surface-esterified type described in Patent 2,657,149, Iler, of which the butyl ester is marketed as "Valron" (also called "G.S. Silica") by the Du Pont Chemical Company, and silicas which have been treated with various alkyl chlorosilanes in the manner of Patents 2,510,661; 2,563,555, both granted to Safford and assigned to the same assignee as the present invention, and 2,584,085, Stross.

Silicas prepared by various methods may be treated with heavy metal salts or hydrous heavy metal oxide to prepare heavy metal silicates which are water insoluble and usually amorphous. An example of a precipitated hydrated calcium silicate containing aggregates of particles of the order of 30 to 50 m$\mu$ is described in "Chemical and Engineering News," 24, page 3147 (1946), and marketed as "Silene EF" by Columbia Chemical Division of the Pittsburgh Plate Glass Company.

Another type of filler that can be used is alumina, high surface area alumina being preferred. Among these high surface area compounds are aluminas such as (1) hydrated aluminum oxide (C-730) made by Aluminum Company of America which comprises 34.7% combined water and 64.4% $Al_2O_3$ (chemically aluminum oxide trihydrate) and is of an average particle size of about 0.5 micron, (2) activated (dehydrated) aluminum oxide which is dehydrated C-730 obtained by heating for 64 hours at 480° F. to remove 28% of the combined water, (3) activated (dehydrated) alumina produced by calcining at elevated temperatures to remove essentially all the combined water, (4) alpha alumina, made by Linde Air Products Company, average particle size of about 0.3 micron, (5) gamma alumina, such as Alon I, manufactured by Godfrey L. Cabot, Inc., of Boston, Mass.

Gamma alumina ($Al_2O_3$) having a certain crystalline structure is prepared in such a way that it is different from most of the common aluminum oxide now available. One method of preparing gamma alumina is to vaporize the anhydrous aluminum chloride by heating it, said heating being carried out with natural gas. The water formed as a result of the combustion hydrolyzes the aluminum chloride in the vapor state, which at a temperature of about 500° F. (which characterizes the low temperature designation of the gamma alumina) dehydrates and converts to a fine particle size gamma alumina oxide which is then collected and freed of excess hydrogen chloride. The average particle size of this particular alumina (as shown by agreement between electron microscope examination and nitrogen absorption methods) is very small and is for the most part less than about 100 millimicrons in size, average particle size being from about 20 to 40 millimicrons. The particles are generally of uniform size and shape and the surface area of the gamma alumina is within the range of about 40 to 130 sq. meters per gram. Another method of making this gamma alumina is to vaporize anhydrous aluminum chloride and hydrolyze it in the vapor state with high temperature steam, whereby the actual hydrolysis takes place preferably at about 500° F. The gamma alumina, having a hazy X-ray gamma structure, undergoes a change to a sub-gamma structure as the temperature is raised progressively up to about 900° C., where a transition to a sharp alpha pattern takes place. More detailed information regarding gamma alumina may be found in the article by M. H. Jellinek and I. Fankuchen, "X-ray Diffraction Examination of Gamma Alumina" in "Industrial and Engineering Chemistry," page 158 (February 1945).

Many types of finely divided carbon blacks (colloidal carbon) can be used in our invention such as animal or vegetable, channel, furnace and thermal carbon black, etc. A good description of the preparation of carbon blacks is contained in Faith et al., "Industrial Chemicals," pages 174–182, published by John Wiley and Sons, New York (1950). Among the various grades of suitable carbon blacks are channel; channel, conducting; channel, hard processing; channel, medium processing; channel, easy processing; furnace, conducting; furnace, fine; furnace, high modulus; furnace, high elongation; furnace, reinforcing; furnace, semi-reinforcing; thermal fine; thermal medium; acetylene; lampblack, etc.

A partial list of some of the preferred fillers useful in this invention is presented below in Table I.

TABLE I

| Filler | Description | Particle Size, m$\mu$ | Source |
| --- | --- | --- | --- |
| Aerosil (Cab-O-Sil) | Fumed silica | 15–20 | Godfrey L. Cabot. |
| Valron (G.S. Silica) | Hydrophobic silica aerogel. | 6–7 | Du Pont. |
| Hisil X303 | Precipitated Silica. | 20–30 | Columbia Southern. |
| Hisil 101 | do | 20–30 | Do. |
| Santocel-C | Silica Aerogel | 10 | Monsanto. |
| Hisil 233 | Precipitated Silica. | 25 | Columbia Southern. |
| Syloid 244 | do | 2–3×10$^3$ | Davison Chemical. |
| Silene EF | Hydrated, precipitated calcium silicate. | 2–3×10$^2$ | Columbia Southern. |
| P-33 | Fine Thermal Black. | 170 | R. T. Vanderbilt Company. |
| Micronex W6 | Easy Processing Channel Black (EPC). |  | Benney and Smith Company. |
| Phil Black O | HAF (High Abrasion Furnace). | 45 | Phillips Petroleum. |
| Vulcan 9 | SAF Carbon Black. | 60 | Godfrey L. Cabot. |
| Alon C | $Al_2O_3$ (Gamma) | 5–40 | Do. |

Among the tertiary peroxides which can be used to cure polyethylene containing the preferred fillers are those having the following formula

R—O—O—R′ where R and R′ (which may or may not be similar) are radicals selected from the group consisting of

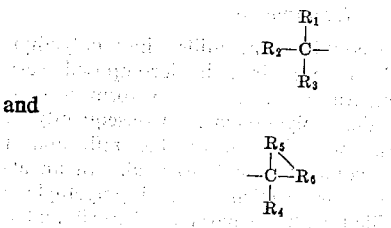

These peroxides may be described as peroxides in which each of the peroxide oxygens is linked directly to a tertiary carbon atom whose remaining valences are attached to radicals selected from the group consisting of $R_1$, $R_2$, $R_3$, $R_4$, $R_5$, and $R_6$. $R_1$, $R_2$, $R_3$, $R_4$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cycloalkyl-alkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide,

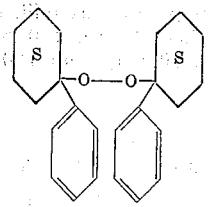

Mixtures of these peroxides may also be used.

In addition, these peroxides may contain inorganic groups, such as halogens, nitro groups, etc., for example, chlorophenyl, bromophenyl, nitrophenyl, etc.

The peroxides disclosed herein can be prepared by any of the methods known to the art. For example, di-α-cumyl peroxide,

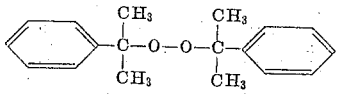

(sold by Hercules Powder Co. of Wilmington, Delaware), can be prepared by the method described by Kharasch et al. in the "Journal of Organic Chemistry" 15, pages 756–762 (1950), tert-butyl-α-cumyl peroxide,

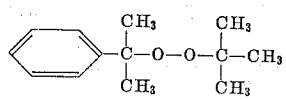

by the method of Kharasch et al. in the "Journal of Organic Chemistry" 15, pages 775–781 (1950), etc.

*Tensile strength and percent elongation.*—A very important property that must be taken into consideration determining the uses to which a plastic may be applied is tensile strength. Tensile strength can be defined as the greatest longitudinal stress a substance can withstand without rupture. It is usually expressed with reference to a unit cross section area, such as pounds per square inch necessary to produce rupture.

A property usually measured at the same time as tensile strength is percent elongation, which term can be defined as the total stretch or deformation in the direction of the load or, stated another way, the per unit length change caused by a tensile force. It is the amount of permanent stretch before rupture expressed as percentage of the original length.

After the filler-containing molded sheets of polyethylene were cured, the room temperature tensile samples having thickness of 50–100 mils were die cut with a conventional dumbbell-type tensile die which was 0.125″ wide at the narrow region. These samples were tested for tensile strength and percent elongation, using a Scott tester, Model L6 having a pulling speed of 2″ per min. Both tensile strength and percent elongation were measured according to ASTM procedures D412–51T.

The tensile strength was calculated in the usual manner from the pounds of force exerted at the break. Percent elongation was determined by measuring the extension at break and comparing this distance with an initial fixed distance.

For high temperature tensile strength tests (125–145° C.) a larger size die cut dumbell-type sample was used for easier manipulation at elevated temperature (0.250″ wide at the narrowest region). These samples were tested for tensile strength and percent elongation using a Scott tester, Model LP, with a pulling speed of 20 inches per minute and equipped with a high temperature conditioning cabinet. Each sample was conditioned from 5 to 10 minutes at the elevated test temperature before being heat tested.

Fillers have a very pronounced and unpredictable effect on the tensile strength of polyethylene. For example, when fillers are incorporated in polyethylene, a slight increase or a reduction in room temperature tensile strength is noted depending on the filler used. The effect of using any specific peroxide as a curing agent for filled polyethylene is equally unpredictable for the results depend on the combination of the specific peroxide and specific filler employed.

Although we have found it difficult to satisfactorily cure filled polyethylene with acyl peroxides of the benzoyl peroxide type, the use of tertiary peroxides as a curing agent for polyethylene containing the preferred fillers has resulted in polyethylene of somewhat enhanced high temperature tensile strength. But these results are lower than the superior high temperature tensile strengths obtained by curing polyethylene containing the preferred fillers with di-α-cumyl peroxide.

Di-α-cumyl peroxide-cured polyethylene containing preferred fillers possesses markedly improved properties as compared to di-α-cumyl peroxide-cured polyethylene containing other fillers or filled polyethylene cured with other peroxides. This superiority is demonstrated by comparing the results obtained in the following examples which are given by way of illustration and not by way of limitation. All parts and percentages are by weight.

*Example 1*

DYNH polyethylene (70 parts) and Fe₂O₃ (30 parts) were mixed on a rubber mill at 120° C. until a homogeneous sheet was obtained. Thereupon, di-α-cumyl peroxide 2.1 parts) was milled into the sheet. This product pressed into a 50–60 mil sheet by heating in a press for 30 minutes at 160° C. under 1000 p.s.i. had a tensile strength (145° C.) of 145 p.s.i. and an elongation (145° C.) of less than 25%.

Example 2

Alathon #1 polyethylene (70 parts) and Aerosil (30 parts) were mixed and cured in the manner of Example 1 using the same amount of di-α-cumyl peroxide (2.1 parts). A sheet of this product had a tensile strength (145° C.) of 746 p.s.i. and an elongation (145° C.) of 350%.

Example 3

Polyethylene (DYNH, 70 parts) and calcium silicate (Cilene EF, 30 parts) were mixed and cured in the manner of Example 1 using the same amount of di-α-cumyl peroxide (2.1 part). A sheet of this product had a tensile strength (145° C.) of 363 p.s.i. and an elongation (145° C.) of 100%.

Example 4

Alathon #7 polyethylene (60 parts) and calcium carbonate (20 parts) were mixed on a rubber mill at 120° C. until a homogeneous sheet was obtained. Thereupon di-α-cumyl peroxide (4 parts) was milled into the sheet. This product pressed into a 50–60 mil sheet by heating in a press for 30 minutes at 170° C. under 1000 p.s.i. had a tensile strength (125° C.) of 96 p.s.i. and an elongation (125° C.) of 200%.

Example 5

The proportions and method in this example were the same as Example 4 except that Catalpo Clay (Georgia kaolin purged of grit, mica and silica, having a pH of 7.0–7.2 and a particle size of about 0.5 micron, Southern Clay Inc.) was substituted for calcium carbonate.

This product had a tensile strength (135° C.) of 122 p.s.i. and an elongation (135° C.) of 400%.

Example 6

The proportions and methods in this example were the same as Example 4 except that aluminum silicate (Clay 33, Southern Clay Co.) was used in place of calcium carbonate. The tensile strength (135° C.) of this product was not measurable because it was so low.

Example 7

The proportions and method in this example were the same as Example 4 except that Aerosil was substituted for calcium carbonate. This product had a tensile strength (135° C.) of 480 p.s.i., and an elongation (135° C.) of 600%.

Additional tensile strength and percent elongation measurements were taken of examples prepared according to the method of Example 1, using parts by weight of polyethylene, filler and peroxide as indicated in Table II.

Example 28

Benzoyl peroxide could not be milled into polyethylene on a hot rubber mill since it decomposed very rapidly at the temperature necessary to form a continuous sheet of the polyethylene. Consequently a cross-linked material was formed on the mill and a satisfactory product could not be fabricated. In an attempt to circumvent this problem DYNH polyethylene (70 parts) was milled with 30 parts of Aerosil and a sheet pressed of this material. The sheet was cut in ca. ⅛″ squares and shaken with 1.9 parts of benzoyl peroxide. The filled polymer and powdered peroxide where then heated together in a press for 1 minute at 120° C. and 15 minutes at 130° C. The sheet which was very yellow and non-uniform had a tensile strength (145° C.) of 87 p.s.i. and an elongation (145° C.) of 350%.

Example 29

Polyethylene (DYNH, 70 parts) and Aerosil (30 parts) were milled into a sheet at 100–110° C. Thereupon, di-t-butyl diperphthalate (4.4 parts) was added. The material showed signs of cross-linking on the mill. This product which was pressed into a sheet at 140° C. for 30 minutes had a tensile strength (145° C.) of 74 p.s.i. and an elongation (145° C.) of 250%.

Example 30

A methylpolysiloxane gum having a room temperature viscosity of 500,000 centipoises was prepared by heating octamethylcyclotetrasiloxane with 0.02% by weight of tetrabutylphosphonium hydroxide at 110° C. for about ½ hour and by subsequently devolatilizing the product.

Example 31

Alathon #10 (50 parts) was milled into a sheet at 130–135° C. and then Aerosil (40 parts) was added thereto. Thereupon silicone gum (50 parts) prepared

TABLE II

| Ex. | Poly-Ethylene | | Filler | | Peroxide [1] | | Room Temp. | | 145° C. | |
|---|---|---|---|---|---|---|---|---|---|---|
| | Pts. by wt. | Name | Pts. by wt. | Name | Percent | Name | Tensile (p.s.i) | Elong. (percent) | Tensile (p.s.i.) | Elong. (percent) |
| 8 | 100 | Alathon #1 | none | | none | | 1,538 | 715 | 0 | 0 |
| 9 | 100 | do | none | | 3 | DCP | 2,085 | 500 | 85 | 225 |
| 10 | 70 | do | 30 | Aerosil | none | | 1,985 | 400 | 88 | 25 |
| 11 | 70 | do | 30 | do | 2 | DCP | 2,665 | 475 | 403 | 400 |
| 12 | 70 | do | 30 | do | 3 | DCP | 2,860 | 450 | 746 | 350 |
| 13 | 70 | do | 30 | do | 4 | DCP | 2,950 | 400 | 492 | 250 |
| 14 | 70 | do | 30 | do | 5 | DCP | 3,200 | 400 | 466 | 175 |
| 15 | 70 | do | 30 | do | 10 | DCP | 2,855 | 350 | 630 | 200 |
| 16 | 80 | DYNH | 20 | Syloid 244 | 3 | DCP | 2,665 | 450 | 488 | 300 |
| 17 | 70 | DYNH | 30 | do | 5 | DCP | 2,840 | 385 | 856 | 200 |
| 18 | 70 | DYNH | 45 | Santocel-CS treated.[2] | 5.8 | DCP | 2,135 | 400 | 636 | 400 |
| 19 | 55 | DYNH | 45 | Alon C | 4.1 | DCP | 2,770 | 450 | 343 | 325 |
| 20 | 55 | DYNH | 45 | Alon 1 | 4.1 | DCP | 2,760 | 525 | 715 | 450 |
| 21 | 70 | DYNH | 30 | P-33 Carbon Black. | 4 | DCP | 3,325 | 200 | 545 | 200 |
| 22 | 70 | DYNH | 30 | do | 5 | DCP | 3,530 | 150 | 604 | 140 |
| 23 | 60 | DYNH | 40 | do | 5 | DCP | 2,890 | 100 | 647 | 110 |
| 24 | 50 | DYNH | 50 | do | 6 | DCP | 2,845 | 0 | 554 | 100 |
| 25 | 60 | Alathon #2 | 40 | SAF Carbon | 5 | DCP | | | 650 | 250 |
| 26 | 70 | DYNH | 30 | Cab-O-Sil-O | 4.1 | t-butyl α-cumyl peroxide. | 2,670 | 600 | 290 | 300 |
| 27 | 70 | DYNH | 30 | do | 3.9 | di-t-amyl peroxide. | | | 260 | 450 |

[1] Percent peroxide based on weight of polyethylene used.
[2] Treated with trimethylchlorosilane and fired subsequently at 250° C.

in Example 30 was added, followed by 2.25 parts of di-α-cumyl peroxide. The sheet produced was cured by heating under pressure for 30 minutes at 160° C. This product had the following properties:

TABLE III

| Temperature | Tensile Strength | Percent Elongation |
| --- | --- | --- |
| Room temperature | 1,485 | 325 |
| 145° C | 531 | 150 |

In addition to organopolysiloxanes, other polymers can be blended with polyethylene in the manner described above. In general, those polymers, preferably elastomers, which are capable of being peroxide-cured may be incorporated into the preferred filler-polyethylene compositions.

The uncured polymeric compositions which, according to the present invention, may be blended with the preferred filler-polyethylene compositions and cured to polymers of enhanced properties comprise organopolysiloxanes having a carbon to silicon linkage, such as those disclosed and claimed in Agens Patent 2,448,756; Sprung Patents 2,448,556 and 2,484,595; Krieble et al. Patent 2,457,688; Hyde Patent 2,490,357; Marsden Patent 2,521,528; Warrick Patent 2,541,137, etc.; copolymers of butadiene and styrene (where the butadiene, e.g., butadiene-1,3, may comprise from 20 to 80% of the total weight of the butadiene and styrene), an example of which is G.R.S. rubber; copolymers of butadiene and acrylonitrile (where the butadiene may comprise from about 55 to 80% of the total weight of the butadiene and the acrylonitrile), an example of which is Hycar OR rubber; polymeric chloroprene or 2-chlorobutadiene, an example of which is neoprene; polymers of monohydric alcohol esters of acrylic acid, e.g., polymeric methyl acrylate, polymeric butyl acrylate, such polymeric materials ranging from tough, pliable rubber-like substances in the case of the polymeric methyl acrylate to softer and more elastic products in the case of the polymeric, longer chain alkyl acrylates (examples of polymeric alkyl acrylates which may be employed are more particularly described in Semegen Patents 2,411,899, 2,412,475 and 2,412,476) and are sold under the name of, for instance, Polyacrylic Ester EV; polystyrene (either liquid or solid); chlorosulfonated polyethylenes, such as Hypolon S-2 (Du Pont) etc., and natural rubbers, e.g., smoke sheet and natural crepe, etc. Mixtures of these above-described polymeric compositions may also be incorporated into the filler-polyethylene compositions.

From the foregoing, it is apparent that tertiary peroxide cured and most particularly di-α-cumyl peroxide-cured polyethylene and polyethylene blends containing a preferred filler possess markedly improved tensile strength, particularly at high temperatures, as compared to tertiary perodixe cured or di-α-cumyl peroxide-cured polyethylene containing other fillers or filled polyethylene cured with other peroxides. It is noted (Examples 26 and 27) that the use of tertiary peroxides (besides di-α-cumyl peroxide) as a curing agent for polyethylene containing the preferred fillers has resulted in polyethylene of somewhat enhanced high temperature tensile strength although these results are lower than the superior high temperature tensile strengths obtained by curing polyethylene containing the preferred filters with di-α-cumyl peroxide. These products have greater tensile strengths than peroxide cured polyethylene or polyethylene blends previously known. These properties make DCP-cured filled polyethylene and blends thereof particularly adaptable for hot strength films or tapes for electrical insulations or electrical parts, such as spark plug caps, for household utensils which are used at elevated temperatures, for molded industrial parts, such as jet fuel cartridges, etc., for industrial laminates, for conduits or containers for hot liquids, etc., as well as other uses which will appear to those skilled in the art. DDCP-cured polyethylene and blends thereof containing conducting carbon black are useful as strong but flexible heating pads and tape. Mixtures of these fillers as well as modifying agents, such as dyes, pigments, stabilizers, etc., may be added to the various polyethylene compositions without departing from the scope of the invention. Although the weight percent of filler based on total weight of filler and polyethylene can be varied over wide limits, such as from about 1 to 75%, the preferable percent of filler is from 20–50%. Besides heat, other means of initiating peroxide cure can be used such as ultraviolet irradiation, etc.

What we claim as new and desire to secure by Letters Patent of the United States is:

1. A curable composition comprising (1) polyethylene, (2) a peroxide in which each of the peroxide oxygens is linked directly to a tertiary carbon atom whose remaining valences are attached to radicals selected grom the group consisting of alkyl, cycloalkyl, alkyl cycloalkyl, aryl, and aralkyl, and (3) a filler selected from the group consisting of silica, carbon black, alumina and calcium silicate.

2. The composition of claim 1 which has been cured by heating to a temperature in the range of 150 C. to just below the decomposition temperature of the polyethylene.

3. The composition as in claim 1 wherein the polyethylene is blended with a polymer selected from the class consisting of solid organopolysiloxanes having carbon to silicon linkages, polymers containing a polymerized conjugated butadiene, polymers of acrylic acid esters, polystyrene, chlorosulfonated polyethylenes and mixtures of said materials.

4. The composition of claim 3 wherein the polymer blended with the polyethylene is a solid organopolysiloxane having carbon to silicon linkages.

5. The composition of claim 1 wherein the peroxide is t-butyl-α-cumyl peroxide.

6. The composition of claim 1 wherein the peroxide is di-t-amyl peroxide.

7. The composition of claim 1 wherein the peroxide is di-α-cumyl peroxide.

8. The composition of claim 1 wherein the peroxide is di-α-cumyl peroxide and the polyethylene is blended with a solid organopolysiloxane having carbon to silicon linkages.

9. The composition of claim 8 which has been cured by heating to a temperature of 150 C. to just below the decomposition temperature of the polymer.

10. The composition of claim 1 wherein the filler is carbon black.

11. A composition comprising polyethylene, di-α-cumyl peroxide and carbon black.

12. The composition of claim 11 which has been cured by heating to a temperature in the range of 150 C. to just below the decomposition temperature of the polymer.

13. A process of curing a composition comprising (1) polyethylene, (2) a peroxide in which each of the peroxide oxygens is linked directly to a tertiary carbon atom whose remaining valences are attached to radicals selected from the group consisting of alkyl, cycloalkyl, alkyl cycloalkyl, aryl, and aralkyl, and (3) a filler selected from the group consisting of silica, carbon black, alumina and calcium silicate, which comprises heating the composition to a temperature in the range of 150 C. to just below the decomposition temperature of the polyethylene.

14. The process of claim 13 wherein the polyethylene is blended with a polymer selected from the group consisting of solid organopolysiloxanes having carbon to silicon linkages, polymers containing a polymerized conjugated butadiene, polymers of acrylic aicd esters, polystyrene, chlorosulfonated polyethylenes, and mixtures of said materials.

15. The process of claim 13 wherein the peroxide is di-α-cumyl peroxide.

16. The process of claim 13 wherein the peroxide is di-α-cumpl peroxide and the polyethylene is blended with a solid organopolysiloxane having carbon to silicon linkages.

References Cited in the file of this patent

UNITED STATES PATENTS 2,748,104    Viohl  ---------------- May 29, 1956

FOREIGN PATENTS 149,565    Australia  -------------- June 2, 1949

UNITED STATES PATENT OFFICE
CERTIFICATE OF CORRECTION

May 26, 1959

Patent No. 2,888,424

Frank M. Precopio et al.

It is hereby certified that error appears in the printed specification of the above numbered patent requiring correction and that the said Letters Patent should read as corrected below.

Column 1, line 28, for "as a" read -- as an --; line 41, for "42" read -- 42 --; column 2, line 60, for "46" read -- 46 --; column 3, line 60, for "24" read -- 24 --; column 5, lines 67 and 75, for "15", each occurrence, read -- 15 --; column 6, line 71, for "2.1 parts)" read -- (2.1 parts) --; column 7, line 11, for "Cilene" read -- Silene --; column 10, line 2, for "DDCP" read -- DCP --; line 20, for "grom" read -- from --; column 11, line 6, for "cumpl" read -- cumyl --.

Signed and sealed this 27th day of October 1959.

(SEAL)
Attest:

KARL H. AXLINE
Attesting Officer

ROBERT C. WATSON
Commissioner of Patents